(12) United States Patent
Mishra et al.

(10) Patent No.: US 9,004,871 B2
(45) Date of Patent: Apr. 14, 2015

(54) STACKED WHEEL ASSEMBLY FOR A TURBINE SYSTEM AND METHOD OF ASSEMBLING

(75) Inventors: Anil Mishra, Rajasthan (IN); Meelan Ravindra Nanivadekar, Maharashtra (IN)

(73) Assignee: General Electric Company, Schenectady, NY (US)

( * ) Notice: Subject to any disclaimer, the term of this patent is extended or adjusted under 35 U.S.C. 154(b) by 501 days.

(21) Appl. No.: 13/588,679

(22) Filed: Aug. 17, 2012

(65) Prior Publication Data

US 2014/0050563 A1   Feb. 20, 2014

(51) Int. Cl.
*F01D 5/06* (2006.01)
*B23P 11/00* (2006.01)
*F16B 5/02* (2006.01)
*F16B 39/10* (2006.01)

(52) U.S. Cl.
CPC ......... *F16B 5/0275* (2013.01); *Y10T 29/49321* (2015.01); *F01D 5/066* (2013.01); *F16B 39/10* (2013.01)

(58) Field of Classification Search
CPC ........... F01D 5/022; F01D 5/06; F01D 5/066; F16B 5/0275; F16B 39/10
See application file for complete search history.

(56) References Cited

U.S. PATENT DOCUMENTS

| | | | |
|---|---|---|---|
| 3,821,973 A | 7/1974 | Carmien | |
| H32 H | 3/1986 | Kartik et al. | |
| 4,844,694 A * | 7/1989 | Naudet | 416/198 A |
| 4,887,949 A * | 12/1989 | Dimmick et al. | 411/121 |
| 5,052,891 A * | 10/1991 | Burkholder | 416/198 A |
| 5,350,278 A * | 9/1994 | Burge | 416/198 A |
| 5,388,963 A | 2/1995 | Dimmick, III et al. | |
| 5,796,202 A | 8/1998 | Herron et al. | |
| 6,322,306 B1 | 11/2001 | Dutton | |
| 6,422,812 B1 * | 7/2002 | Pepi et al. | 415/115 |
| 6,428,272 B1 * | 8/2002 | Pepi et al. | 416/96 R |
| 6,499,957 B1 * | 12/2002 | Klingels et al. | 416/198 A |
| 2005/0089385 A1 | 4/2005 | Lin | |
| 2005/0191151 A1 | 9/2005 | Gethmann | |
| 2010/0284767 A1 | 11/2010 | Shue | |

FOREIGN PATENT DOCUMENTS

| | | |
|---|---|---|
| EP | 0463751 | 1/1992 |
| EP | 0556514 | 8/1993 |
| EP | 0704601 | 4/1996 |
| EP | 0714645 | 6/1996 |
| EP | 0820739 | 1/1998 |

* cited by examiner

*Primary Examiner* — Igor Kershteyn
(74) *Attorney, Agent, or Firm* — Cantor Colburn LLP (57) ABSTRACT

A stacked wheel assembly for a turbine system includes a plurality of wheels. A stud includes a forward end having a circumferential surface with at least one relatively planar portion and a first groove extending circumferentially around at least a portion of the circumferential surface. A first nut is disposed proximate a forward face of one of the plurality of wheels to receive the forward end of the stud. A resilient arcuate member is configured to fittingly reside within the first groove. A lock plate having at least one slotted region is disposed proximate an outer surface of the lock plate to fittingly engage at least one lug disposed on a forward region of the first nut for rotationally retaining the stud and a second groove is disposed within an inner surface of the lock plate to receive the resilient arcuate member for axially retaining the lock plate.

20 Claims, 7 Drawing Sheets

STACKED WHEEL ASSEMBLY FOR A TURBINE SYSTEM AND METHOD OF ASSEMBLING

BACKGROUND OF THE INVENTION

The subject matter disclosed herein relates to turbine systems, and more particularly to a stacked wheel assembly, as well as a method of assembling such a stacked wheel assembly.

A rotor of a turbine system is typically formed from a number of wheels that are configured to rotate about a central axis of the turbine system. Various assemblies have been attempted to position and retain the wheels, with one such assembly including stacking the wheels in close proximity and forming a bolted joint to fixedly retain the wheels relative to each other. A bolt or stud extends through the wheels, where a nut is engaged to one end of the bolt or stud and another nut is engaged to the other end of the bolt or stud. Upon assembly or disassembly of the wheel assembly, an anti-rotation force must be exerted on one nut and the stud while the other nut is rotated. During assembly, anti-rotation is of particular importance based on the need to achieve a requisite bolted joint preload. Typically, the stud anti-rotation is facilitated via a feature on torqueing tool, however, spatial constraints often render insertion and maneuvering of the torqueing tool inefficient and/or cumbersome with this feature.

BRIEF DESCRIPTION OF THE INVENTION

According to one aspect of the invention, a stacked wheel assembly for a turbine system includes a plurality of wheels configured to rotate about a central axis, wherein the plurality of wheels form at least a portion of the rotor. Also included is a stud including a forward end having a circumferential surface with at least one relatively planar portion and a first groove extending circumferentially around at least a portion of the circumferential surface, wherein the stud extends through the plurality of wheels for retaining the plurality of wheels relative to each other. Further included is a first nut disposed proximate a forward face of one of the plurality of wheels and configured to receive the forward end of the stud. Yet further included is a resilient arcuate member configured to fittingly reside within the first groove of the stud. Also included is a lock plate having at least one slotted region disposed proximate an outer surface of the lock plate configured to fittingly engage at least one lug disposed on a forward region of the first nut for rotationally retaining the stud and a second groove disposed within an inner surface of the lock plate configured to receive the resilient arcuate member for axially retaining the lock plate relative to the stud.

According to another aspect of the invention, a stacked wheel assembly for a turbine system includes a plurality of wheels configured to rotate about a central axis, wherein the plurality of wheels form at least a portion of a rotor. Also included is a stud including a forward end having a circumferential surface with at least one relatively planar portion, wherein the stud extends through the plurality of wheels for retaining the plurality of wheels to each other. Further included is a first nut disposed proximate a forward face of one of the plurality of wheels and configured to receive the forward end of the stud. Yet further included is a lock plate having at least one slotted region disposed proximate an outer surface of the lock plate configured to fittingly engage at least one lug disposed on a forward region of the first nut for rotationally retaining the stud. Also included is at least one pin extending through the forward region of the first nut for axially retaining the lock plate.

According to yet another aspect of the invention, a method of assembling a stacked wheel assembly for a turbine system is provided. The method includes inserting a stud through a plurality of wheels for retaining the plurality of wheels relative to each other. Also included is fixedly engaging a first nut to a forward end of the stud in a threaded relationship. Further included is rotationally retaining the stud by aligning at least one slotted region of a lock plate with at least one lug of the first nut and placing the lock plate over the forward end of the stud.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
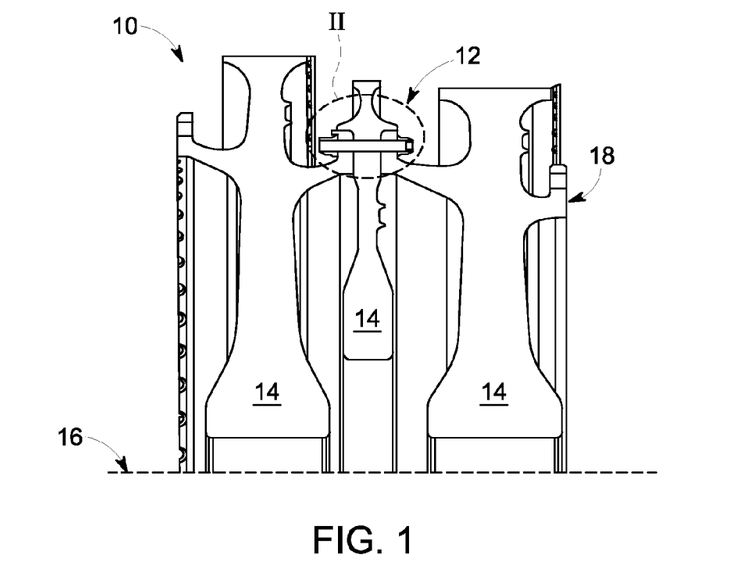
FIG. 1 is a partial, schematic illustration of a stacked wheel assembly of a turbine system.
Figure 2:
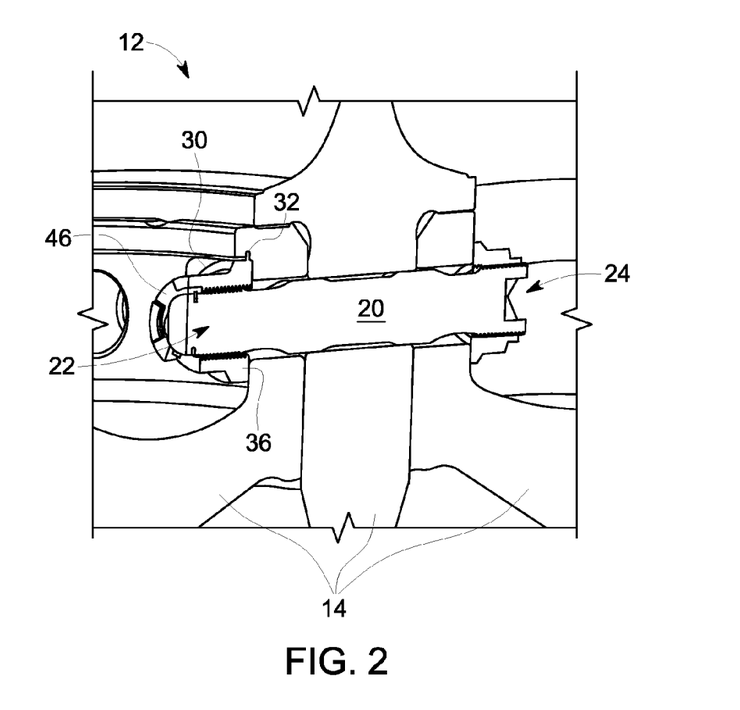
FIG. 2 is an enlarged, perspective view of section II of FIG. 1, illustrating the stacked wheel assembly in greater detail.
Figure 3:
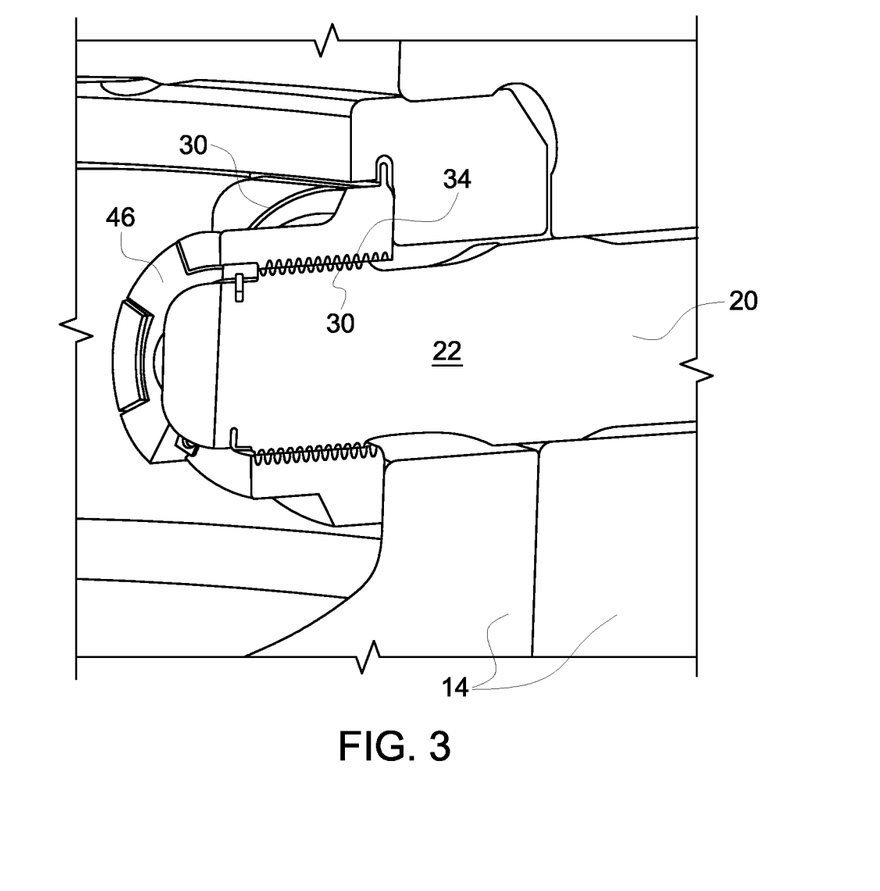
FIG. 3 is a perspective view of a forward end of the stacked wheel assembly.

Referring to FIGS. 1-3, a rotary machine, such as a turbine or compressor of a turbine system 10 is schematically illustrated. In particular, a stacked wheel assembly 12 of the turbine system 10 is shown. The stacked wheel assembly 12 includes a plurality of wheels 14 axially stacked relative to each other, with each wheel mounting one or more circumferentially spaced blades (not illustrated). Each of the plurality of wheels 14 is configured to rotate about a central axis 16 of the turbine system 10, thereby facilitating rotation of the circumferentially spaced blades mounted thereto. The stacked wheel assembly 12 comprises mechanical components to maintain the stacked axial relationship of the plurality of wheels 14. It is to be appreciated that the number of stacked wheel assemblies present in the turbine system 10 may vary, as the stacked wheel assembly comprises a variety of numbers of wheels. For example, in the illustrated embodiment, three wheels are axially retained to each other. Irrespective of the precise number of wheels axially retained by the stacked wheel assembly 12, the plurality of wheels 14 frictionally engage each other to form all or a portion of a rotor 18 of the turbine system 10.

Figure 4:
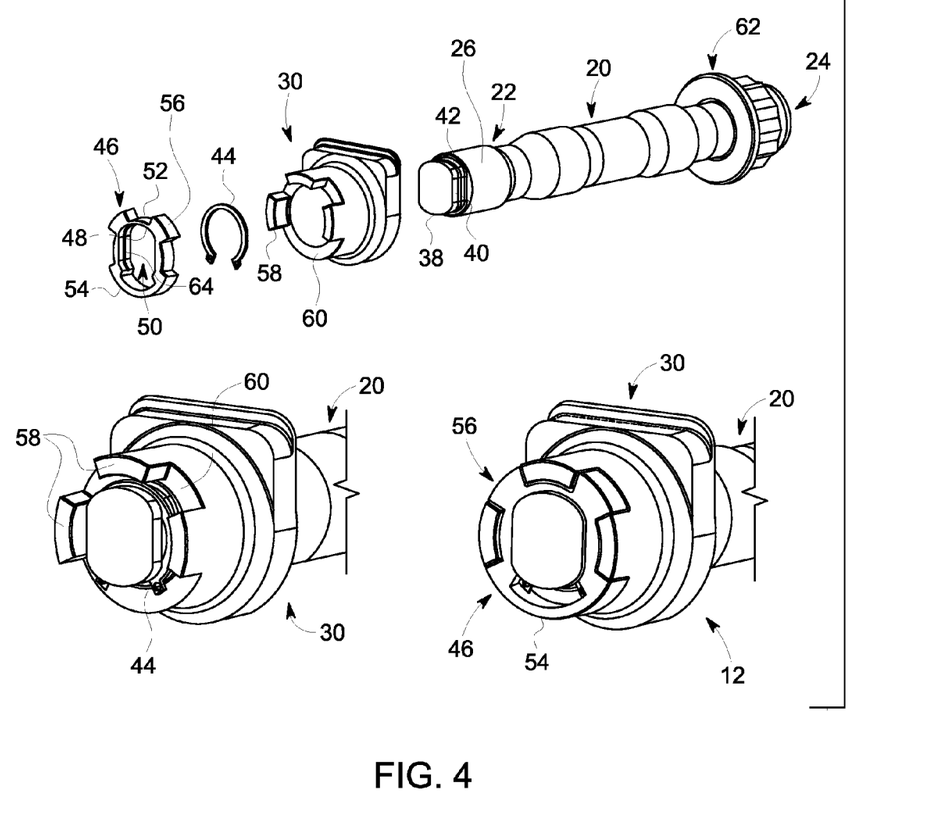
FIG. 4 is an exploded and assembly illustration of the stacked wheel assembly according to a first embodiment.

Referring now to FIG. 4, in addition to FIGS. 1-3, a first embodiment of the stacked wheel assembly 12 is illustrated in greater detail. The stacked wheel assembly 12 includes an elongated mechanical fastener, such as a stud 20 having a forward end 22 and an aft end 24 that extends through aligned apertures of the plurality of wheels 14. Both the forward end 22 and the aft end 24 include a circumferential surface 26 having an externally threaded portion 28. The externally threaded portion 28 located proximate the forward end 22 is configured to engage a first nut 30. The first nut 30 is disposed in an annular recess 32 formed about the periphery of at least one of the plurality of wheels 14. The first nut 30 includes an internally threaded region 34 for forming a threaded engagement with the forward end 22 of the stud 20 and is disposed proximate a forward face 36 of a portion of one of the plurality of wheels 14, specifically the most forwardly positioned wheel of the stacked wheel assembly 12.

The circumferential surface 26 located proximate the forward end 22 of the stud 20 typically includes at least one arcuate portion 38 and at least one relatively planar portion 40. Additionally, the forward end 22 of the stud 20 includes a first groove 42 within, and extending at least partially around, the circumferential surface 26. The first groove 42 is shaped to receive a resilient arcuate member 44, such as a snap ring, that resides therein.

A lock plate 46 is configured to be positioned over the forward end 22 of the stud 20 and radially inwardly of the first nut 30. The lock plate 46 includes a radially inner surface 48 defining a central aperture 50 for fittingly surrounding the circumferential surface 26 of the stud 20. Specifically, the radially inner surface 48 comprises a geometry corresponding to that of the circumferential surface 26 of the stud 20, including a portion corresponding to the relatively planar portion 40 of the circumferential surface 26. The corresponding geometry of the relatively planar portion 40 and the radially inner surface 48 of the lock plate 46 provides an anti-rotational arrangement between the stud 20 and the lock plate 46. The lock plate 46 also includes at least one slotted region 52 proximate an outer surface 54 of the lock plate 46 and is defined by at least one, but typically a plurality of radially extending protrusions 56. The at least one slotted region 52 is sized to fittingly engage at least one lug 58 extending axially forward from a forward region 60 of the first nut 30. It is to be appreciated that a plurality of slotted regions and/or lugs may be included. Based on the anti-rotational arrangement between the stud 20 and the lock plate 46, the fitting engagement between the lock plate 46 and the first nut 30, as described above, ensures anti-rotation of the stud 20 relative to the first nut 30 during rotation of a second nut 62 threaded to the aft end 24 of the stud 20. Anti-rotation of the stud 20 relative to the first nut 30 is particularly beneficial during installation or disassembly of the stacked wheel assembly 12.

In addition to the rotational retention described above, the stacked wheel assembly 12 provides axial retention. As previously described, the resilient arcuate member 44 is configured to reside within the first groove 42 of the circumferential surface 26 proximate the forward end 22 of the stud 20. The resilient arcuate member 44 is also configured to reside within a second groove 64 extending circumferentially around the radially inner surface 48 of the lock plate 46. The resilient arcuate member 44 provides an axial retention force between the stud 20 and the lock plate 46, thereby retaining the lock plate 46 in the axial direction.

Figure 5:
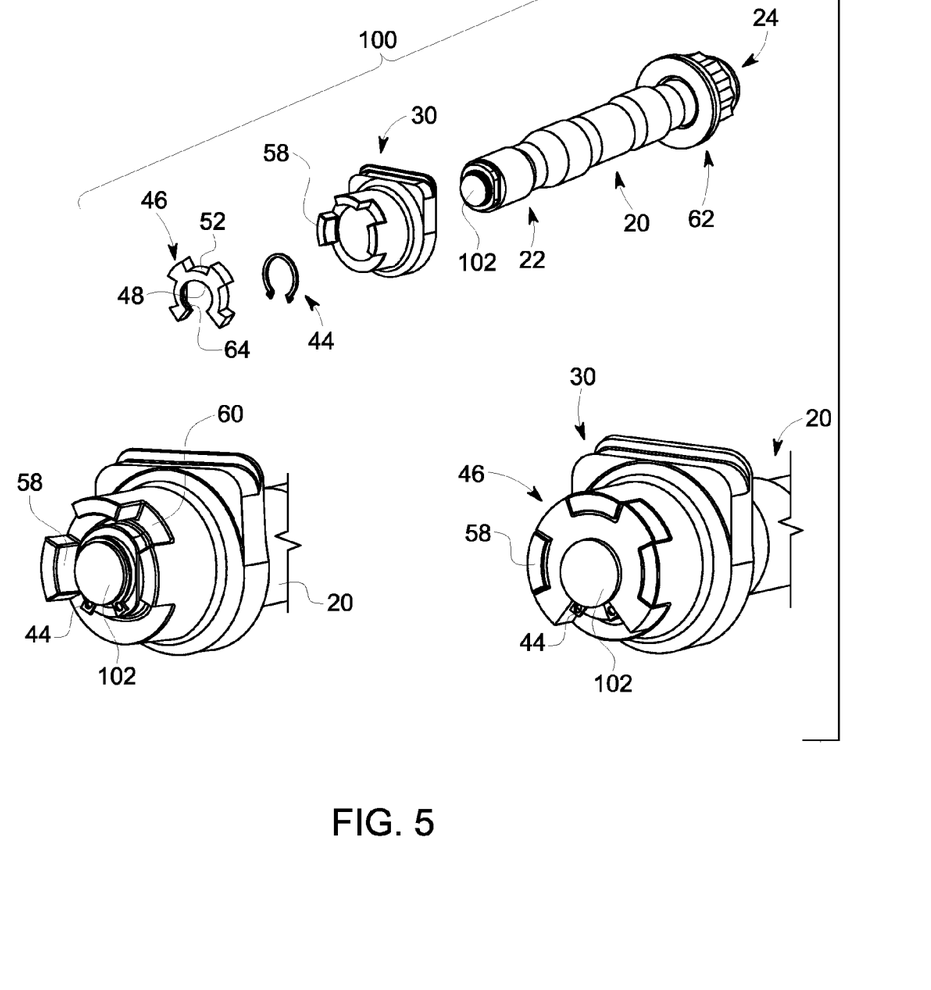
FIG. 5 is an exploded and assembly illustration of the stacked wheel assembly according to a second embodiment.

Referring now to FIG. 5, a second embodiment of a stacked wheel assembly 100 is illustrated. The second embodiment of the stacked wheel assembly 100 is similar to the first embodiment described in detail above, such that description of each component is not necessary to sufficiently describe the second embodiment and similar reference numerals are employed where applicable. Similar to the first embodiment, the stacked wheel assembly 100 includes the stud 20 that forms a threaded engagement with the first nut 30 and the second nut 62 at the forward end 22 and the aft end 24, respectively. The first nut 30 includes the at least one lug 58 that corresponds to the at least one slotted region 52 of the lock plate 46 to provide the anti-rotational arrangement described in detail above, with respect to the first embodiment. The stacked wheel assembly 100 includes an axially extending protrusion 102 that is integrally formed with the forward end 22 of the stud 20. The first groove 42 is located within, and extends at least partially around, the axially extending protrusion 102. As with the first embodiment, the first groove 42 is configured to receive the resilient arcuate member 44, which axially retains the stud 20 to the lock plate 46 by disposition of the resilient arcuate member 44 within the second groove 64 of the radially inner surface 48 of the lock plate 46.

Figure 6:
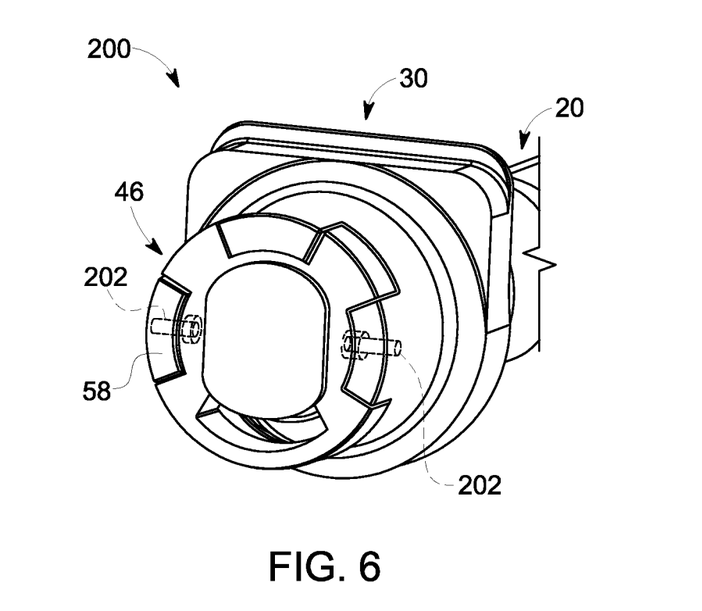
FIG. 6 is a perspective view of the stacked wheel assembly according to a third embodiment.
Figure 7:
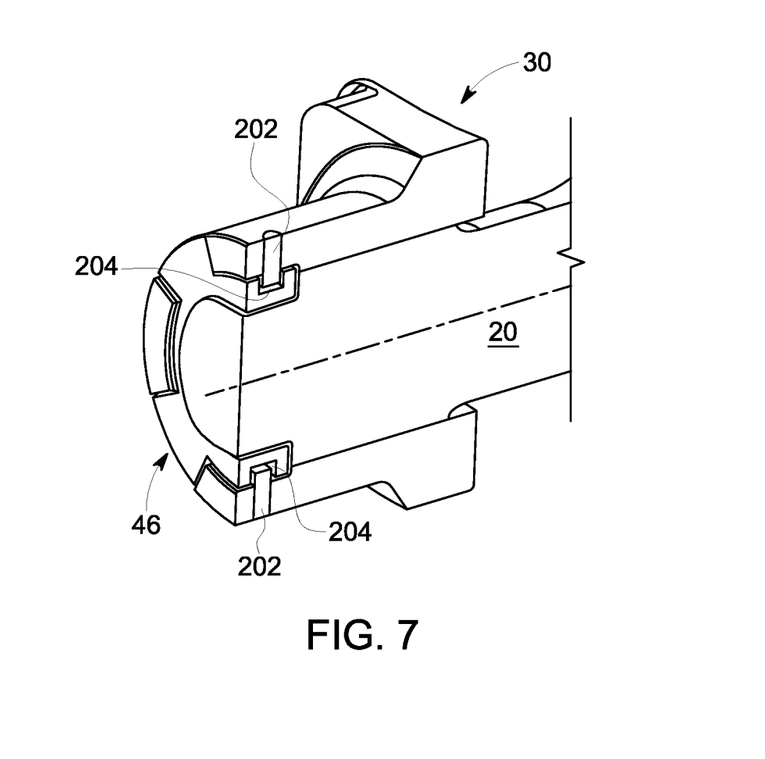
FIG. 7 is a perspective, cross-sectional view of the stacked wheel assembly according to the third embodiment of FIG. 6.

Referring now to FIGS. 6 and 7, a third embodiment of a stacked wheel assembly 200 is illustrated. The third embodiment of the stacked wheel assembly 200 is similar to the embodiments described in detail above, such that description of each component is not necessary to sufficiently describe the third embodiment and similar reference numerals are employed where applicable. Similar to the previous embodiments, the stacked wheel assembly 200 includes the stud 20 that forms a threaded engagement with the first nut 30 and the second nut 62 at the forward end 22 and the aft end 24, respectively. The first nut 30 includes the at least one lug 58 that corresponds to the at least one slotted region 52 of the lock plate 46 to provide the anti-rotational arrangement described in detail above, with respect to the previous embodiments. In contrast to the previous embodiments, axial retention of the lock plate 46 relative to the stud 20 is achieved by insertion of at least one pin 202 radially inwardly through the forward region 60 of the first nut 30 and into a pin receiving recess 204. The pin receiving recess 204 is disposed within the outer surface 54 of the lock plate 46. It is to be appreciated that the lock plate 46 may include a plurality of pin receiving recesses to accommodate a plurality of pins for additional axial retention.

Figure 8:
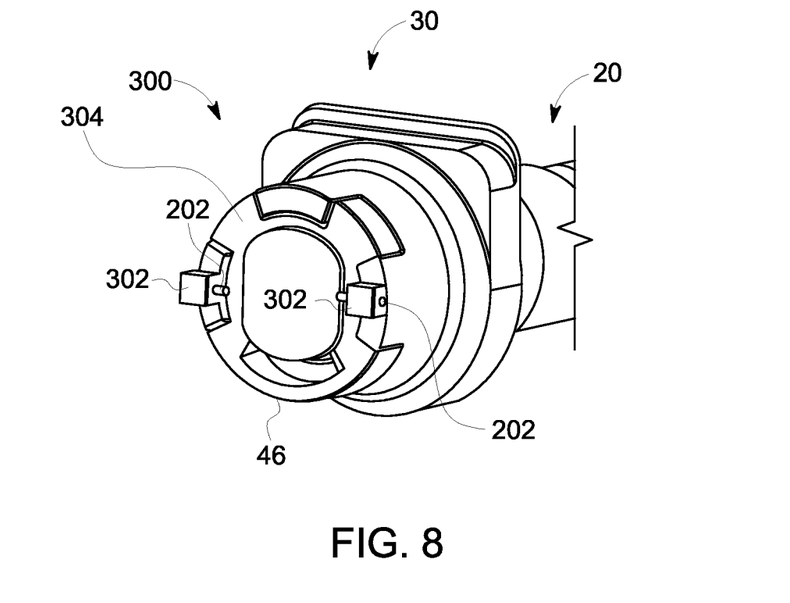
FIG. 8 is a perspective view of the stacked wheel assembly according to a fourth embodiment.
Figure 9:
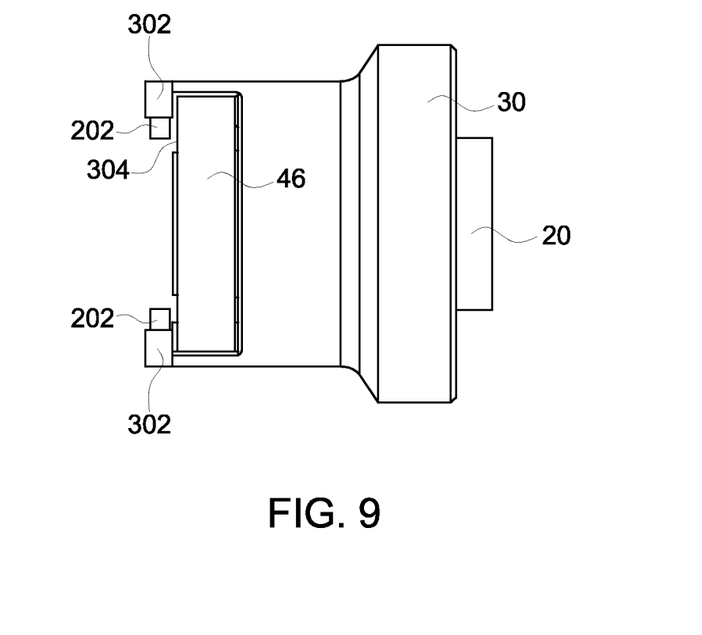
FIG. 9 is a perspective, cross-sectional view of the stacked wheel assembly according to the fourth embodiment of FIGS. 8.

Referring now to FIGS. 8 and 9, a fourth embodiment of a stacked wheel assembly 300 is illustrated. The fourth embodiment of the stacked wheel assembly 300 is similar to the embodiments described in detail above, such that description of each component is not necessary to sufficiently describe the fourth embodiment and similar reference numerals are employed where applicable. Similar to the previous embodiments, the stacked wheel assembly 300 includes the stud 20 that forms a threaded engagement with the first nut 30 and the second nut 62 at the forward end 22 and the aft end 24, respectively. The first nut 30 includes the at least one lug 58 that corresponds to the at least one slotted region 52 of the lock plate 46 to provide the anti-rotational arrangement described in detail above, with respect to the previous embodiments. Similar to the third embodiment described above, the at least one pin 202 is employed to axially retain the lock plate 46. The first nut 30 includes at least one forwardly extending pin retainer 302 for fixedly containing the at least one pin 202. The at least one pin 202 extends radially inwardly to an axial location forward of a lock plate forward face 304, such that the lock plate 46 is axially retained by the at least one pin 202. It is to be appreciated that a plurality of pins and forwardly extending pin retainers may be employed.

For each of the preceding embodiments described, it is to be understood that although the rotational and axial retention features are described as being disposed proximate the forward end 22 of the stud 20, such features may also or alternatively be disposed proximate the aft end 24 of the stud 20.

Figure 10:
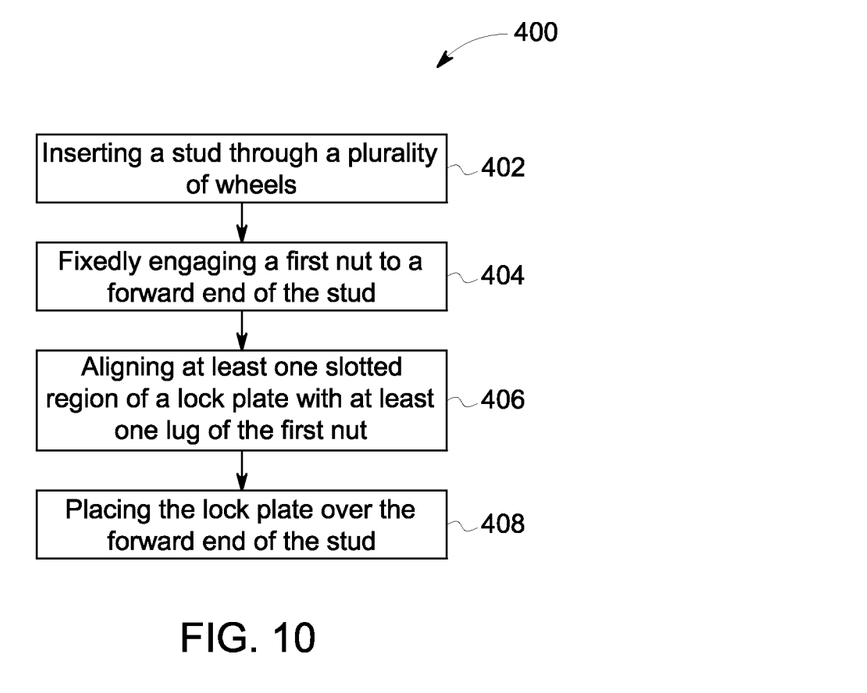
FIG. 10 is a flow diagram illustrating a method of assembling the stacked wheel assembly.

As illustrated in the flow diagram of FIG. 10, and with reference to FIGS. 1-9, a method of assembling a stacked wheel assembly 400 for the turbine system 10 is also provided. The turbine system 10 and the stacked wheel assembly 12 have been previously described and specific structural components need not be described in further detail. The method of assembling a stacked wheel assembly 400 includes inserting a stud through a plurality of wheels 402 to retain the plurality of wheels 14 relative to each other. A first nut is fixedly engaged to a forward end of a stud 404 in a threaded relationship for axially retaining the stud 20 relative to the first nut 30. The stud is rotationally retained by aligning at least one slotted region of a lock plate with at least one lug of the first nut 406, then placing the lock plate over the forward end of the stud 408. The stud 20 and lock plate 46 are axially retained relative to each other by a variety of methods corresponding to the embodiments described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A stacked wheel assembly for a turbine system comprising:
    a plurality of wheels configured to rotate about a central axis, wherein the plurality of wheels form at least a portion of a rotor;
    a stud including a forward end having a circumferential surface with at least one relatively planar portion and a first groove extending circumferentially around at least a portion of the circumferential surface, wherein the stud extends through the plurality of wheels for retaining the plurality of wheels relative to each other;
    a first nut disposed proximate a forward face of one of the plurality of wheels and configured to receive the forward end of the stud;
    a resilient arcuate member configured to fittingly reside within the first groove of the stud; and
    a lock plate having at least one slotted region disposed proximate an outer surface of the lock plate configured to fittingly engage at least one lug disposed on a forward region of the first nut for rotationally retaining the stud and a second groove disposed within an inner surface of the lock plate configured to receive the resilient arcuate member for axially retaining the lock plate relative to the stud.

2. The stacked wheel assembly of claim 1, wherein the lock plate includes a plurality of slotted regions.

3. The stacked wheel assembly of claim 1, wherein the first nut includes a plurality of lugs.

4. The stacked wheel assembly of claim 1, wherein the forward end of the stud includes a threaded portion for engaging a first nut threaded region.

5. The stacked wheel assembly of claim 1, further comprising an aft end of the stud in threaded engagement with a second nut.

6. The stacked wheel assembly of claim 1, further comprising an axially extending protrusion projecting from the forward end of the stud.

7. The stacked wheel assembly of claim 6, wherein the first groove is disposed within the axially extending protrusion.

8. The stacked wheel assembly of claim 7, wherein the resilient arcuate member is disposed between the axially extending protrusion and the lock plate.

9. A stacked wheel assembly for a turbine system comprising:
    a plurality of wheels configured to rotate about a central axis, wherein the plurality of wheels form at least a portion of a rotor;
    a stud including a forward end having a circumferential surface with at least one relatively planar portion, wherein the stud extends through the plurality of wheels for retaining the plurality of wheels relative to each other;
    a first nut disposed proximate a forward face of one of the plurality of wheels and configured to receive the forward end of the stud;
    a lock plate having at least one slotted region disposed proximate an outer surface of the lock plate configured to fittingly engage at least one lug disposed on a forward region of the first nut for rotationally retaining the stud; and
    at least one pin extending through the forward region of the first nut for axially retaining the lock plate.

10. The stacked wheel assembly of claim 9, wherein the at least one pin extends radially inwardly through the first nut to a location proximate a lock plate forward face.

11. The stacked wheel assembly of claim 9, wherein the lock plate includes a pin receiving recess proximate the outer surface of the lock plate for receiving the at least one pin.

12. The stacked wheel assembly of claim 9, wherein the lock plate includes a plurality of slotted regions.

13. The stacked wheel assembly of claim 9, wherein the first nut includes a plurality of lugs.

14. The stacked wheel assembly of claim 9, wherein the forward end of the stud includes a threaded portion for engaging a first nut threaded region.

15. The stacked wheel assembly of claim 9, further comprising an aft end of the stud in threaded engagement with a second nut.

16. A method of assembling a stacked wheel assembly for a turbine system comprising:
    inserting a stud through a plurality of wheels for retaining the plurality of wheels relative to each other;
    fixedly engaging a first nut to a forward end of the stud in a threaded relationship;
    rotationally retaining the stud by aligning at least one slotted region of a lock plate with at least one lug of the first nut and placing the lock plate over the forward end of the stud.

17. The method of claim 16, further comprising axially retaining the lock plate relative to the stud by disposing a snap ring within a first groove disposed within an outer surface of the stud and within a second groove disposed within an inner surface of the lock plate.

18. The method of claim 16, further comprising axially retaining the lock plate by disposing at least one pin through the first nut radially inwardly to a location proximate a lock plate forward face.

19. The method of claim 16, further comprising axially retaining the lock plate by disposing at least one pin through the first nut radially inwardly and into a pin receiving recess of the stud.

20. The method of claim 16, further comprising engaging a second nut to an aft end of the stud.

* * * * *